United States Patent
Narayanan (10) Patent No.: US 8,903,058 B2
(45) Date of Patent: Dec. 2, 2014

(54) CONVEYING CALL SUBJECT MATTER WITH VOICE DATA

(75) Inventor: Giridhar Kalpathy Narayanan, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 929 days.

(21) Appl. No.: 12/123,818

(22) Filed: May 20, 2008

(65) Prior Publication Data

US 2009/0290693 A1    Nov. 26, 2009

(51) Int. Cl.
| | |
|---|---|
| H04M 1/64 | (2006.01) |
| H04M 1/725 | (2006.01) |
| H04M 1/57 | (2006.01) |
| H04M 1/247 | (2006.01) |
| H04M 1/656 | (2006.01) |
| H04M 3/42 | (2006.01) |
| H04M 1/2745 | (2006.01) |
| H04M 1/663 | (2006.01) |
| H04M 1/253 | (2006.01) |

(52) U.S. Cl.
CPC .......... *H04M 1/578* (2013.01); *H04M 1/72566* (2013.01); *H04M 2250/60* (2013.01); *H04M 1/2473* (2013.01); *H04M 3/42051* (2013.01); *H04M 1/72597* (2013.01); *H04M 1/27455* (2013.01); *H04M 1/663* (2013.01); *H04M 1/2535* (2013.01); *H04M 1/656* (2013.01); *H04M 2203/654* (2013.01); *H04M 3/42* (2013.01)
USPC ....................... 379/88.23; 455/415

(58) Field of Classification Search
CPC .................. H04M 1/57; H04M 1/663; H04M 2203/2011; H04M 3/436; H04M 3/53316
USPC ................................ 379/67.1, 88.17, 373.02
See application file for complete search history.

(56) References Cited

U.S. PATENT DOCUMENTS

| | | | |
|---|---|---|---|
| 5,625,683 A | 4/1997 | Nazanin et al. | 379/355 |
| 6,041,103 A | 3/2000 | La Porta et al. | 379/67.1 |
| 6,621,800 B1 | 9/2003 | Klein | 370/282 |
| 6,741,689 B2 | 5/2004 | Burg | 379/201.01 |
| 6,757,533 B2 | 6/2004 | Lampela et al. | 455/415 |
| 6,766,007 B1 | 7/2004 | Dermler | 379/201.01 |
| 6,993,497 B2 | 1/2006 | Yeh et al. | 705/10 |
| 7,003,087 B2 | 2/2006 | Spencer et al. | 379/211.01 |
| 7,068,648 B2 | 6/2006 | Strathmeyer | 370/352 |
| 7,145,998 B1 | 12/2006 | Holder et al. | 379/210.01 |
| 7,155,002 B2 | 12/2006 | Hagiwara | 379/210.01 |
| 7,233,229 B2 | 6/2007 | Stroupe et al. | 340/309.7 |

(Continued)

OTHER PUBLICATIONS

U.S. Appl. No. 12/123,923, filed May 20, 2008 entitled "Communication Reminders".

(Continued)

*Primary Examiner* — Fan Tsang
*Assistant Examiner* — Solomon Bezuayehu
(74) *Attorney, Agent, or Firm* — Andrew Smith; Jim Ross; Micky Minhas (57) ABSTRACT

Embodiments are configured to provide information associated with a communication event to a communication party. In an embodiment, components of a communication system operate to provide a recorded call subject to a receiving party as part of a communication event. In one embodiment, a communication device can be used to record, package, and transmit subject matter as part of a communication event, wherein the recorded subject matter can be used to inform a receiving party of a communication subject.

20 Claims, 7 Drawing Sheets

(56) References Cited

U.S. PATENT DOCUMENTS

| | | | |
|---|---|---|---|
| 7,248,677 | B2 | 7/2007 | Randall et al. ............. 379/93.23 |
| 2001/0019603 | A1 | 9/2001 | McMahon .................. 379/67.1 |
| 2003/0063590 | A1 | 4/2003 | Mohan ........................... 455/88 |
| 2004/0018830 | A1 | 1/2004 | Pugliese ....................... 455/567 |
| 2004/0037403 | A1 | 2/2004 | Koch ...................... 379/142.16 |
| 2005/0286687 | A1 | 12/2005 | Sanmugasuntharam et al. ......................... 379/88.19 |
| 2006/0002536 | A1 | 1/2006 | Ambrose |
| 2007/0004383 | A1* | 1/2007 | Agozo .................... 455/414.1 |
| 2007/0036302 | A1* | 2/2007 | Cho ........................... 379/88.23 |
| 2007/0047726 | A1* | 3/2007 | Jabbour et al. ........... 379/373.02 |
| 2007/0070940 | A1 | 3/2007 | Vander Veen et al. |
| 2007/0071184 | A1 | 3/2007 | Clift .......................... 379/88.01 |
| 2007/0116246 | A1 | 5/2007 | Walker ..................... 379/266.07 |
| 2007/0165607 | A1* | 7/2007 | Mussman et al. ............. 370/352 |
| 2007/0174081 | A1 | 7/2007 | Smith et al. |
| 2007/0208798 | A1* | 9/2007 | Kagawa et al. ............... 709/201 |
| 2007/0248221 | A1 | 10/2007 | Chatterjee ............... 379/211.02 |
| 2008/0226055 | A1 | 9/2008 | Holder et al. |
| 2008/0273677 | A1* | 11/2008 | Alfano et al. ............. 379/93.17 |
| 2009/0290696 | A1 | 11/2009 | Giridhar ................. 379/142.04 |
| 2010/0020948 | A1* | 1/2010 | Takeda et al. ............. 379/88.17 |
| 2010/0093313 | A1 | 4/2010 | Keihag |

OTHER PUBLICATIONS

Office Action mailed Dec. 2, 2011, in co-pending U.S. Appl. No. 12/123,923.

Office Action mailed Mar. 29, 2012, in co-pending U.S. Appl. No. 12/123,923.

Office Action mailed Sep. 23, 2013, in co-pending U.S. Appl. No. 12/123,923.

Notice of Allowance mailed Mar. 20, 2014, in co-pending U.S. Appl. No. 12/123,923.

http://www.voiceroundtable.com/adobe_pdf_files/audiopoint_comm_off.pdf, "Community Offering for the Audiopoint Service," John Craig with Joe Saunders, Bob Cuthriell and Nick Unger, 21 pages, Aug. 25, 2000.

http://ieeexplore.ieee.org/iel2/666/5208/00200771.pdf?tp=&isnumber=&arnumber=200771, "The Electronic Receptionist: A Knowledge-Based Approach to Personal Communications," Gifford, W.S. and Turock, D.L., Wireless Communications, 1992.

http://www.archive.org/details/tucows_197757_Talking_Caller_Id, Internet: Archive: Details: Talking Caller ID, 2 pages, Jul. 9, 2004.

http://www.callwave.com/Landing/internetAnsweringMachine_L1.asp, "Callwave for Home is your Internet Answering Machine," 2 pages., 2008.

http://nerdvittles.com/index.php?p=180, "Introducing Telephone Reminders 3.0: The Free Asterisk Telephone Reminder System," 7 pages, Jun. 1, 2007.

http://www.interruptions.net/literature/Dey-HUCOO.pdf, "CybreMinder: A Context-Aware System for Supporting Reminders," Future Computing Environments Group, College of Computing and GVU Center, Georgia Institute of Technology, Atlanta, Georgia USA, 15 pages, 2000.

http://help2.virginmedia.com/help/getContent.jspx?page=h_telephony_advanced_reminder_call_2, "Reminder Call Help," 3 pages, Sep. 17, 2004.

* cited by examiner

CONVEYING CALL SUBJECT MATTER WITH VOICE DATA

RELATED APPLICATIONS

This application is related to U.S. patent application Ser. No. 12/123,923, filed, May 20, 2008, and entitled, "COMMUNICATION REMINDERS," having which is hereby incorporated by reference in its entirety.

BACKGROUND

Telephony generally refers to the use of equipment to provide voice communication over distances. Digital telephony uses digital features for telephone services and systems. Internet protocol (IP) telephony uses the Transmission Control Protocol/Internet Protocol (TCP/IP) to provide digitized voice data communications. Computer Telephony Integration ("CTI") enables computers to make and receive voice, fax, and data calls which can also include telephone directory, voicemail, and caller identification (ID) services.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are configured to provide information associated with a communication event to a communication party. In an embodiment, components of a communication system operate to provide a recorded call subject to a receiving party as part of a communication event. In one embodiment, a communication device can be used to record, package, and transmit subject matter as part of a communication event, wherein the recorded subject matter can be used to inform a receiving party of a communication subject.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments are configured to provide information associated with a communication event to a communication party. In an embodiment, components of a communication system operate to provide a recorded call subject to a receiving party as part of a communication event. For example, a voice recording can be used as part of a call setup dialog to inform a receiving party of a reason for the call. Accordingly, the receiving party can listen to the voice recording before deciding to take the call. The receiving party may decide to take the call based in part on the information conveyed in the voice recording. Alternatively, a call reminder or voicemail can be created if the receiving party is unavailable or unable to take the call. For example, a call reminder can be generated to schedule a subsequent call.

In one embodiment, a communication device/system can be used to record, package, and transmit subject matter as part of a communication event, wherein the recorded subject matter can be transmitted as a ring tone to the receiving party. For example, a computer telephony device can be used to record and transmit a voice recording as part of a call setup dialog. The conveyed subject matter can be used to inform a receiving party of a subject to discuss during a communication session. For example, the conveyed subject matter can be used by the receiving party in deciding whether to answer the call.

In another embodiment, components of a unified communication (UC) system can operate to convey recorded information as part of establishing a communication session. Various client devices and applications of the UC system can be configured to enable access to multiple systems/application/devices, and also be used to communicate with one another, including communicating voice data to inform users of an issue to be discussed during the communication session. For example, a user associated with the UC system can use a communication device to decide whether to take a call based in part on the information conveyed in communicated voice data.

In yet another embodiment, a client application, under processor control, can be used in conjunction with a communication device of a UC system to transmit voice and other data as part of a communication session. For example, the client application can be used to package and send a voice recording during a call setup process. The voice recording can be used to convey information as to why the call is being made. A receiving party can use a communication device/system to listen to the transmitted voice recording before deciding whether to answer the call.

Figure 1:
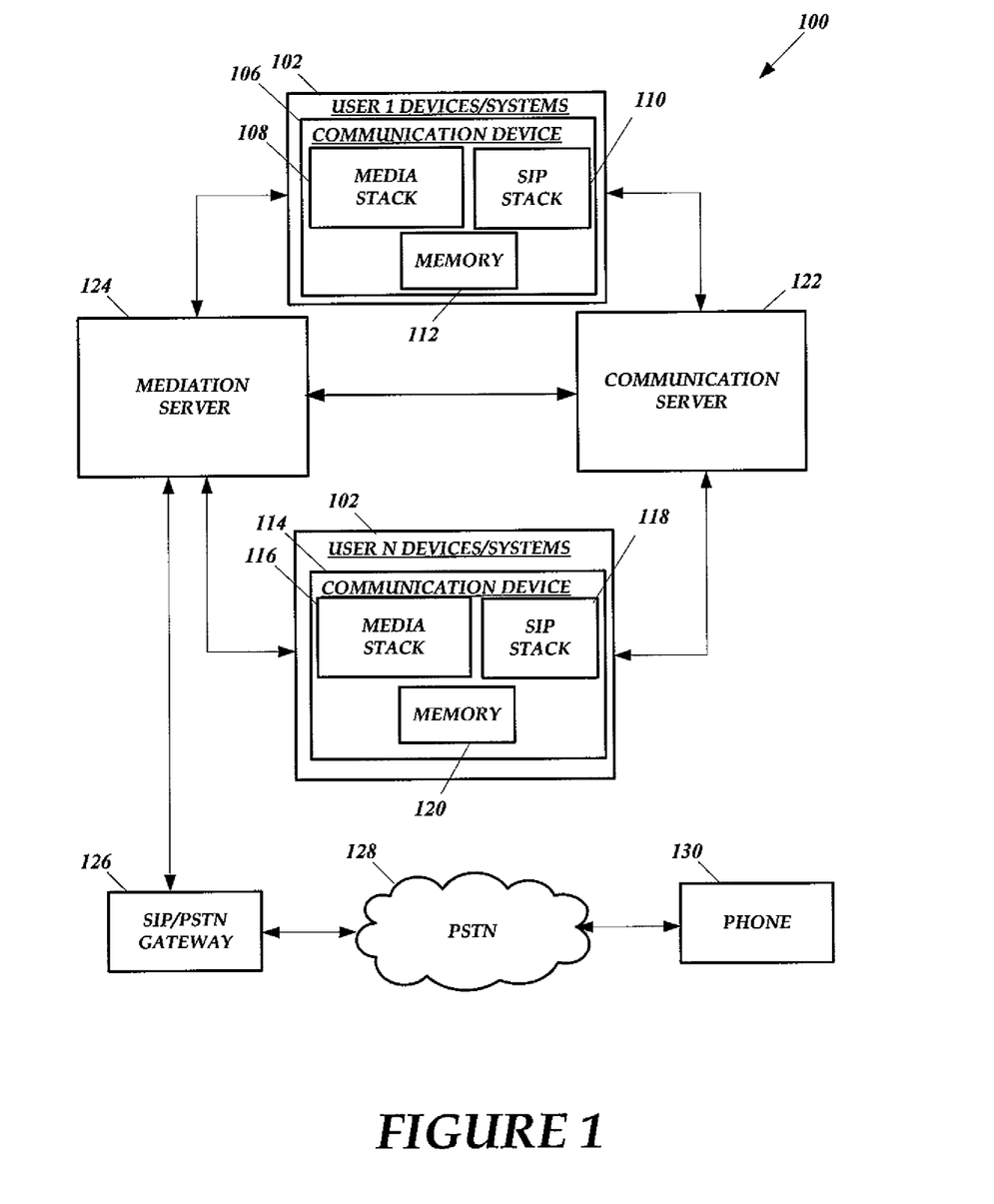
FIG. 1 is a diagram illustrating an exemplary communication system.

FIG. 1 is a diagram depicting an exemplary communication system 100. As described below, components of the system 100 can be used to record, package, transmit, and/or receive voice and other data, but the system 100 is not so limited. Components of the system 100 can be used to generate and communicate voice data which can be used to convey information associated with a communication session. A communication device/system can be used to transmit a voice recording that can be used to convey information that can be used in determining whether to take the call. For example, a user can record a voice recording that includes information to be discussed in a communication session.

The recipient can listen to the voice recording before actually taking the call. A call reminder can be generated if the user cannot take or declines the call and can be made available to the calling and/or called parties to remind each party of a subsequent call. The calling party can also be directed to voicemail if the user is unable to take the call. The system 100 can include various communication and/or computing devices, which include, but are not limited to, computer telephony, handheld and mobile devices, desktop, laptop, and/or other communication and computing devices.

As shown in FIG. 1, the communication system 100 includes device/systems 102 associated with a user 1 and devices/systems 104 associated with an $n^{th}$ user (user N). That is, the communication 100 system can include a plurality of users and associated devices/systems. For example, the devices/systems can include advanced computerized telephony devices, desktop computing devices, handheld/mobile devices, applications, and/or other communication and computing devices. Each user may have multiple devices/systems at his/her disposal. The devices/systems can be configured to execute communication applications to implement voice communications, data communications, video communications, etc. The devices/systems can also be configured to facilitate traditional phone calls through an external connection such as through a private branch exchange (PBX) and a public switched telephone network (PSTN).

The devices/systems 102 associated with user 1 can be used in conjunction with (local and web-based) email applications, calendar applications, contact and/or other applications for business and personal uses. As shown in FIG. 1, the devices/systems 102 encompass communication device(s) 106. For example, user 1 can use a computerized telephony device that includes advanced functions, including Voice over Internet Protocol (VOIP) functionality, and is associated with a networked environment. Additionally, user 1 may be using a cellular phone, personal data assistant (PDA), laptop, and/or desktop computers for business and personal needs.

With continuing reference to FIG. 1, communication device(s) 106 includes a media stack 108, a session initiation protocol (SIP) stack 110, and memory 112, but the device is not so limited. The memory 112 can include read-only memory (ROM), random access memory (RAM), flash memory, and/or other types of memory. The communication device 106 can also include other features, such as a call reminder component that can be used to create, retrieve, modify, and/or delete call reminders.

In an embodiment, the media stack 108 can be configured to establish one or more media channels and control the flow of audible and other data, such as voice recordings, between communication parties. The media stack 108 can operate to encode and decode audible and other data during a communication session which can be used by one or more communication parties, but is not so limited. For example, a receiving party can use a speaker, headphone, or ear piece to listen to decoded voice data before deciding to take an incoming call. In one embodiment, the decoded data can be presented as a ring tone to the receiving party.

The receiving party can use the additional information provided by the decoded voice data to decide whether to take the call. For example, the media stack 108 can package and transmit a voice recording as a ring tone to alert a receiving party of an issue that requires immediate attention to be discussed when the receiving part answers the call. The media stack 108 can also be configured to handle Interactive Connectivity Establishment (ICE) negotiations, echo cancellations, healing, jitter management, and other functions. ICE can be used when a client connects to an associated server from outside a trusted network. Healing and jitter management can assist in ensuring that the media channels established have good quality audio flowing between the parties and give almost similar audio quality comparable to the contemporary PSTN network.

A recording application of the communication device 106 can be used to make a recording in the user's voice for transmitting during the communication session, and the embodiments are not limited to any particular method of recording or recording format. For example, a microphone and voice recorder associated with the communication device 106 can be used to record a subject in a .wav or other audio format that the calling party would like to discuss during a call. In one embodiment, the media stack 108 can use a system API to capture and record subject matter prior to placing a call. The recorded subject matter can be cached using an internal buffer or buffers or saved to a file. Once the remote (e.g., called) party is located and the initial set of messages have been exchanged, the SIP stack 110 forwards the UPDATE message and establishes the invite dialog to have media flowing from either direction. Once the media channel is established, the recorded data can be read from the file or buffer and transmitted by Real Time Protocol (RTP) or other communication protocol.

The voice data can be saved to memory 112 or other storage and used during a communication session. For example, a user can record voice data before or after initiating a communication session, wherein the voice data can be stored in a dedicated buffer for storing voice recordings. In one embodiment, the media stack 108 can be used to package and transmit a voice recording from memory 112 as part of an invite dialog during a RTP session to inform a receiving party of a call subject to discuss for an incoming call. The media stack 108 can initiate the streaming of voice data associated with the voice recording from the memory 112 on an established media channel after the communication device receives an acknowledging (ACK or 200 OK) message that is responsive to an UPDATE message. As described above, the receiving party can use the information provided in the voice recording in deciding whether to take the call.

The SIP stack 110 can operate to create and parse SIP messages, but is not so limited. In an embodiment, the SIP stack 110 can operate to transmit invite requests and parse incoming provisional 1xx responses. The SIP stack 110 can also operate to parse an UPDATE message to update an existing SIP invite dialog. As described above, once the dialog has been updated, the communication device can begin streaming voice data associated with the voice recording using the established media channel.

Business logic for each client can be built on top of the SIP stack 110 to assist in establishing communications between user devices/systems. As described briefly above, the SIP stack 110 can operate to communicate invite requests, parse incoming provisional 1xx responses, UPDATE messages, and/or any final responses. Client diagnostic information can be included in an additional header of a SIP message. The client diagnostic information can be used to communicate a reason for failure of establishment of the invite dialog. The additional header can also be used to pass on pertinent information that can be used to create call reminders when a receiving party is unavailable or unable to take a call.

The devices/systems 104 associated with user N also can be used in conjunction with email applications, calendar applications, contact, and/or other applications. The devices/systems 104 also include communication device(s) 114, such as a computerized telephony device that includes advanced functions as part of a networked environment. User N also may be using a cellular phone, personal data assistant (PDA), laptop, and desktop computers for business and personal needs. Communication device(s) 114 also includes a media stack 116, SIP stack 118, and memory 120. The media stack 116 and SIP stack 118 includes similar functionality and use as described above for media stack 108 and SIP stack 110 of the communication device 106.

With continuing reference to FIG. 1, the communication system 100 also includes a communication server 122 which operates to facilitate communications between end users, but is not so limited. In an embodiment, the communication server 122 can be configured as a UC server which includes registration, presence, instant messaging, routing, conferencing, VOIP, and other functionality to facilitate communications between user 1 devices/systems 102 and user N devices/system 104. As an example, the communication server 122 can be implemented using the functionality of the Microsoft® Office Communications Server. The communication server 122 also includes functionality for real-time conferencing hosted on servers inside a firewall and full-featured VOIP functionality that can be integrated with a PBX infrastructure. The communication server 122 is configured to communicate SIP requests to clients at all registered endpoints, including performing reverse lookup operations when extensions are dialed.

The communication system 100 also includes a mediation server 124. As shown in FIG. 1, the mediation server 124 includes functionality to provide signaling and media translation operations between a VOIP infrastructure and a SIP/PSTN gateway 126 that is in communication with a PSTN network 128. As described below, the mediation server 124 can operate as a remote endpoint for SIP dialog communications with the PSTN network 128. In one embodiment, the mediation server 124 can be configured to send various response messages for an INVITE dialog when the receiving party is located at a PSTN endpoint (e.g., using traditional phone 130), including communicating voice data over a media channel.

Figure 2:
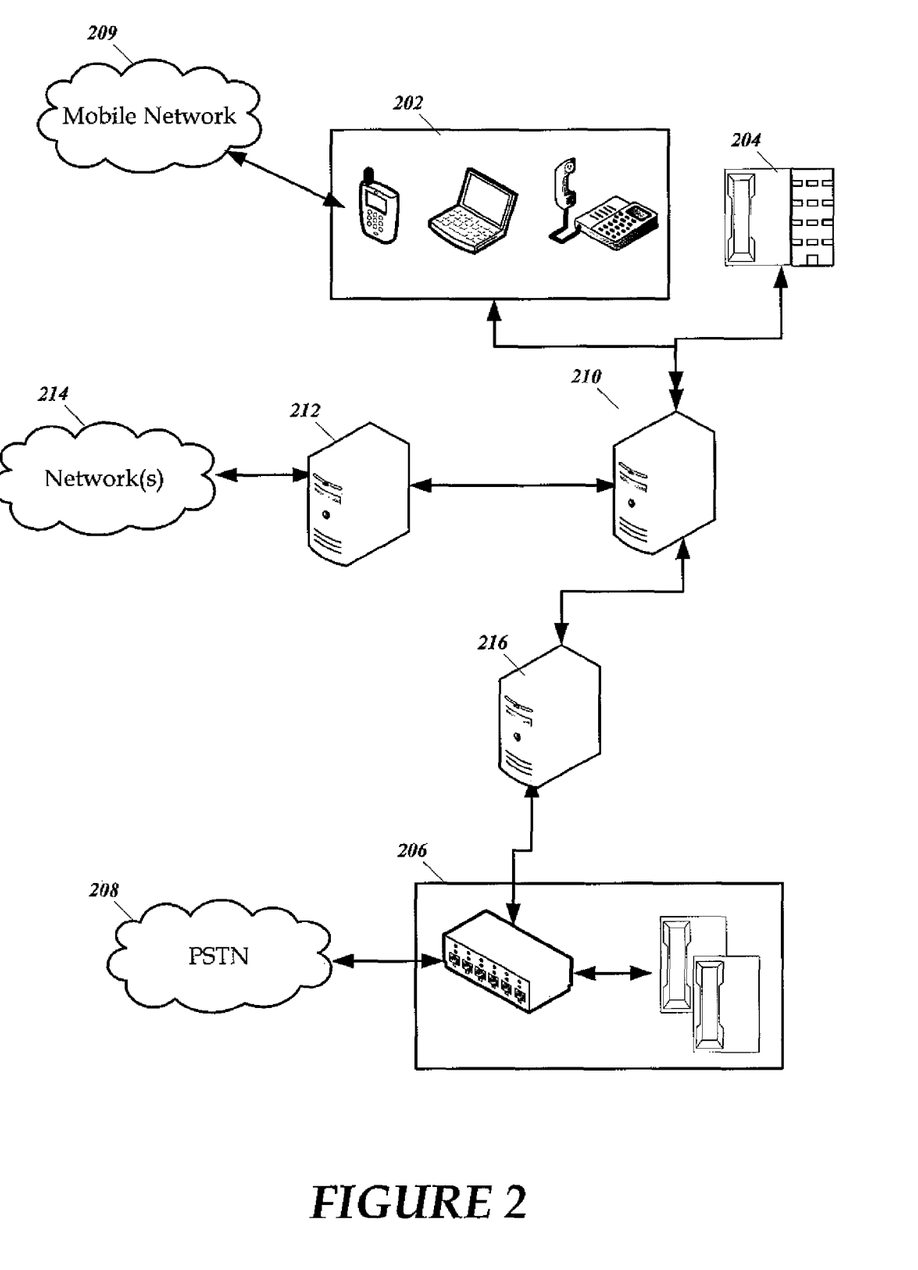
FIG. 2 is a diagram illustrating an exemplary unified communication (UC) system.

The mediation server 124 can also be used to link the communication server 122 with a PBX in both the departmental deployment and PBX integration topologies (also see FIG. 2). The mediation server 124 can be deployed as a stand-alone application server inside a firewall and can operate to communicate with the communication server 122 using a single mutual TLS transport address. The mediation server 124 can also operate to communicate with the gateway 126 using a single Transport Control Protocol (TCP) or Transport Layer Security (TLS) transport address. TCP can be used with gateways that do not support TLS.

As described briefly above, a call reminder can be used to schedule a subsequent communication if a user is unavailable or unable to take a call. For example, after hearing a voice recording in the form of a ring tone, a user may decide that it is ok to decline the call and reschedule for another time using a call reminder. A call reminder can be created to include, but not limited to: user contact card details such as, display name, URIs, phone numbers, address, title, company, etc.; reminder time(s) (e.g., GMT, local time, etc.); reminder type such as one-way (for calling party), two-way (for calling and called party), recurring, etc.; recurring reminder settings; snooze option settings; preferred end-point details such as which devices/systems to call at a particular time; etc. When a scheduled time associated with a call reminder occurs or is to occur, visual, audible, tactile, and/or other cues can issue from an associated communication or computing device to alert or inform a user of a scheduled call or event.

According to an embodiment, call reminders can be created using a call reminder component which can be included with each communication device. In one embodiment, each call reminder component can use information associated with a communicated diagnostic message to obtain information for use in creating call reminders. Each call reminder component can also be configured to use the functionality of a web service client to request information for use in creating call reminders.

A web service client can be used to generate an extensible markup language (XML) request message that complies with the simple object access protocol (SOAP) standard when requesting information that can be included in a call reminder. A SOAP response can be generated based on the request that contains XML data that represents the requested information, including any strongly typed objects and the associated properties. For example, SOAP requests can be used as part of modification, creation, and/or deletion operations for call reminders associated with a user's mailbox. A requesting client can operate to deserialize the SOAP response or responses and use XML data to reconstruct any strongly typed objects.

If the remote party fails to answer, calling party may choose to leave a voicemail or simply hang up. In the first case, a voice mail item can then be included in the remote party's voice mailbox. The remote party would see a missed call notification in if he/she just hung up, ignored, or otherwise did not take the call, but the conveyed subject matter data can alert the remote party as to why the call was made.

As described above, embodiments are configured to provide information communication events to communication parties. For example, a voice recording can be used to inform a communication party of a reason for an incoming call. The voice recording can be recorded, packaged, and/or transmitted using a desktop communication or computing device, laptop, smart phone, personal data assistant (PDA), ultra-mobile personal computer, and/or other computing or communication devices to inform a receiving party of subject matter associated with an incoming call. Components of system 100 described above can be implemented as part of networked, distributed, and/or other computer-implemented and communication environments.

The system 100 can be employed in a variety of computing/communication environments. For example, the system 100 can used with devices/systems having networking, security, and other communication components configured to provide communication functionality with other computing and/or communication devices. While a communication architecture is shown in FIG. 1, functionality of various components can be also combined or further divided. Additionally, the various embodiments described herein can be used with a number of applications, systems, and other devices and are not intended to be limited to any particular implementation or architecture.

Moreover, certain components and functionalities can be implemented in hardware and/or software. While certain embodiments include software implementations, they are not so limited and can encompass hardware, or mixed hardware/software solutions. Also, while certain functionality has been described herein, the embodiments are not so limited and can include different features and/or other functionality. Accordingly, the embodiments and examples described herein are not intended to be limiting and other embodiments are available.

FIG. 2 depicts an exemplary architecture of a UC system 200. As shown in FIG. 2, devices 202 and 204 represent client devices of the UC system 200, which may execute communication applications such a voice communication, video communication, and other communication applications. In addition to their advanced functionality, the end devices may also facilitate traditional phone calls through an external connection such as through PBX 206 and Public Switched Telephone Network (PSTN) 208. End devices may include any type of smart phone, cellular or mobile phone, computer application, and advanced phone devices with additional functionality (e.g. computerized telephone 204). For example, a cellular or mobile device can receive calls through the UC system or through an external mobile network 209. Mobile network 209 can be any wireless communication network, such as a cellular network and includes other components such as transceiver and other communication components.

UC server 210 provides registration, presence, and routing functionalities. Presence functionality enables the system to route calls to a user using any of the client devices assigned to the user based on default and/or user set policies. For example, a user may require that all incoming calls be directed to a unified communication client. Since the end devices can handle additional communication modes, UC server 210 is configured to provide access to additional communication modes (e.g., instant messaging, video communication, etc.) through access server 212. UC server 210 also facilitates communications between users, including communicating voice data and voice recordings to inform communication parties of subject matter pertinent to an incoming communication, such an incoming call.

Access server 212 can reside in a perimeter or other network and enables connectivity through network 214 with other users in one of the additional communication modes. Mediation server 216 mediates signaling and media to and from the PBX 206. Mediation server 216 may also act as a Session Initiation Protocol (SIP) user agent (e.g. Business-To-Business User Agent "B2BUA"). PBX 206 includes a PBX controller and associated traditional phone devices. PBX 206 facilitates receipt and origination of calls through PSTN 208, which can include a combination of networks managed by a number of providers.

The UC system 200 can facilitate an integration of various communication systems. For example, PBX 218 can adhere to SIP. The Session Initiation Protocol (SIP) is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

SIP clients can use TCP or User Datagram Protocol (UDP) to connect to SIP servers and other SIP endpoints. SIP can be used in setting up and tearing down voice or video calls. However, SIP can be used in any application where session initiation is a requirement, including event subscription and notification, terminal mobility, etc. Voice data, including voice recordings, and/or video communications can be communicated over separate session protocols, such as RTP, RTP control protocol (RTCP), etc.

SIP is intended to provide a signaling and call setup protocol for IP-based communications that can support a superset of the call processing functions and features present in the PSTN. In addition to the call-setup and signaling of SIP, SIP is also designed to enable the building of such features in network elements known as proxy servers and user agents. These features permit familiar telephone-like operations, such as: dialing a number, causing a phone to ring, hearing ring back tones or a busy signal. For example, a ring tone can be transmitted to include recorded voice data.

SIP-enabled telephony networks can also implement many of the more advanced call processing features. SIP can be described as a client/server protocol that enables peer-to-peer connectivity due in part because each side can function as a client and a server at the same time. Correspondingly, SIP requires a relatively simple core network with intelligence distributed to the network edge and embedded in endpoints (end devices/systems built in either hardware and/or software). SIP features can be implemented in the communicating endpoints (i.e. at the edge of the network) as opposed to being implemented in the network. While some example systems are described with SIP features, many other VOIP and communication protocols exist and embodiments may be implemented with any of those protocols using the principles described herein.

Figure 3:
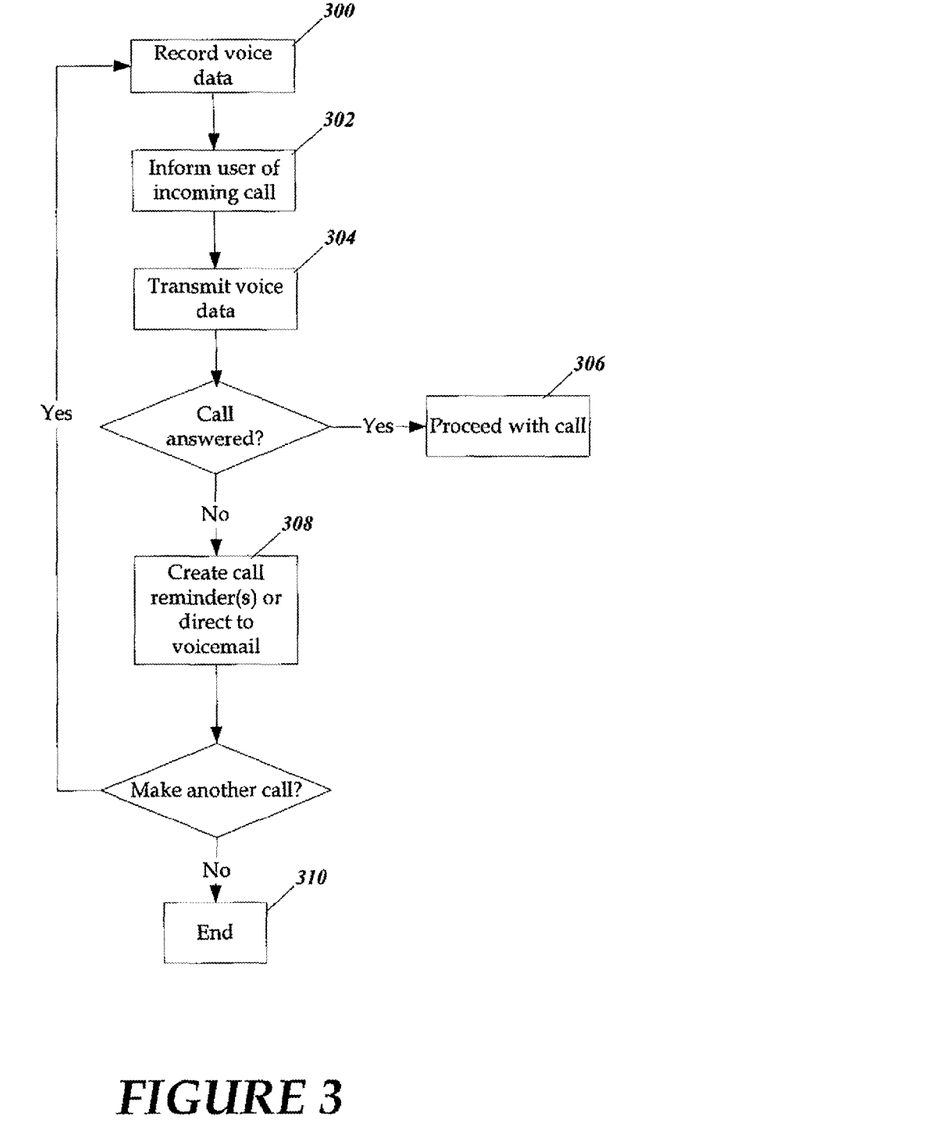
FIG. 3 is a flow diagram illustrating an exemplary process of using recorded voice data during a communication event.

FIG. 3 is a flow diagram illustrating an exemplary process of using recorded voice data during a communication event. Components of FIG. 1 are used in describing the flow diagram, but the described embodiments are not so limited. At 300, user 1 can use a communication device to record voice data to be transmitted during a call setup dialog of a communication session. The voice data can be recorded before or during a call setup dialog. For example, after selecting an intended recipient for a call from a contact list, user 1 can select (e.g., touch, point and click, voice command, etc.) a recording option to record voice data that is to be transmitted during the call setup dialog to the intended recipient. Recorded voice data can also be saved for another transmission or use. Additionally, the voice data can be deleted and replaced with different voice data if an original recording is unsatisfactory. Alternatively, user 1 can initiate a call without recording and transmitting recorded voice data as part of a communication session.

The recorded voice data can be used to inform the recipient (e.g., user N) of subject matter to discuss (e.g., an emergency, collaboration, networking, etc.) by the parties during the communication session. The recipient can listen to the voice data before answering the call since the voice data is being transmitted during the call setup dialog. Accordingly, the recorded voice data can be used by the recipient in deciding whether to take the call. For this example, assume that user 1 has initiated a call after recording the voice data that is to be transmitted during the call setup dialog. For example, user 1 can use a computer-based telephone having a touch screen interface to call user N by selecting user N from a contact list.

At 302, one or more of the devices/systems associated with user N inform user N of an incoming call. For example, user N's computer-based telephone may play a ring tone and/or display a message, to alert user N of the incoming call. At 304, the voice data is transmitted to user N over an established media channel. In one embodiment, the voice data can be transmitted to user N after an INVITE request as part of a SIP dialog. As described above, the voice data can also be conveyed as a ring tone and used to inform user N of the subject matter to be discussed during the communication session. Accordingly, user N has additional information at his/her disposal to use in deciding whether to answer the incoming call.

If user N decides to answer the incoming call, at 306 the users proceed with the call. If user N is unable or unavailable to take the incoming call, at 308 one or more call reminders and/or a voicemail can be created for the incomplete call based in part on the configuration of user N devices/system. For example, user N may have a device configured to generate a diagnostic message that can be used to create a call reminder for the incomplete call, wherein the call reminder can include a rescheduled time, a reminder type, contact information, and other information that can be used to schedule subsequent call. Call reminders can be created for one or more communication parties. The flow returns to 300 if user 1 decides to attempt another call to user N or some other recipient. Otherwise, the flow ends at 310.

Figure 4:
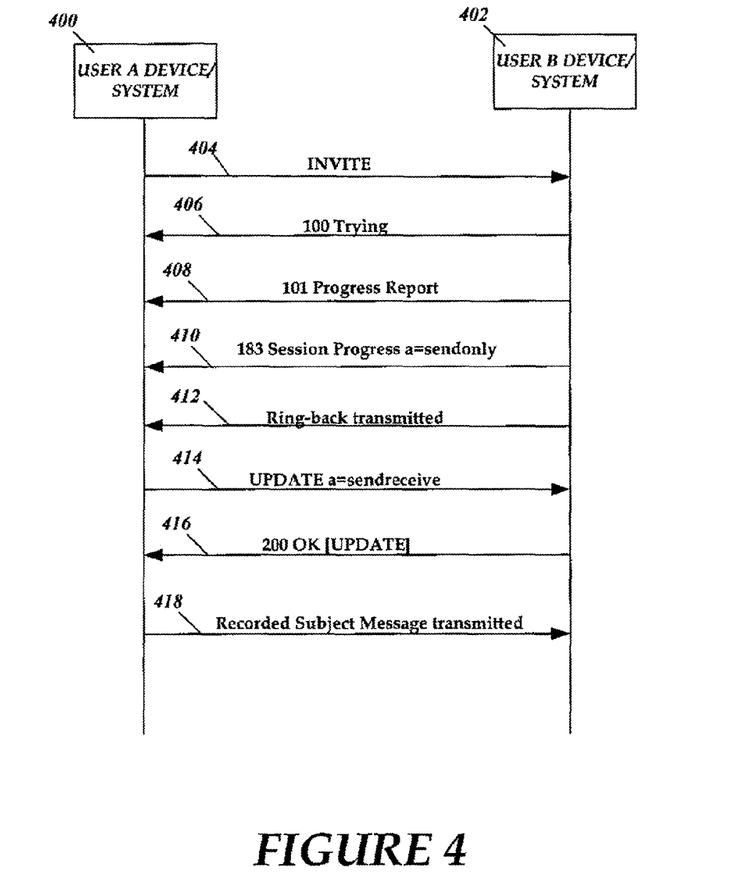
FIG. 4 illustrates an example of using recorded voice data to inform a recipient of a call subject in an integrated telephony system.

FIG. 4 illustrates an example of using recorded voice data to inform a recipient of a call subject in an integrated telephony system. As described above, a user can record voice data, before or during a call setup dialog, that includes information that can be used by a recipient in deciding whether to answer a call. Assume for this example, that user A has already recorded voice data to be transmitted during call setup. For this example, end-to-end communications are using features of the communication server 122 to establish a calling session. However, mediation server 124 and a gateway can be used if a user is using a traditional phone and communicating through a PSTN.

As shown in FIG. 4, user A is using a device/system 400 in an attempt to contact user B at a device/system 402. In an embodiment, user A is using a device/system 400 in an attempt to contact user B at a device/system 402 through a UC architecture. At 404, a call request is received by user B's device/system 402 with an INVITE message. For example, the INVITE message can be communicated through a VOIP gateway or other communication mechanism to user B' device/system 402.

At 406, as part of the communication protocol of an embodiment, user B's device/system 402 communicates a "100 Trying" message at 406, and a "101 Progress Report" at 408. The "100 Trying" message can be used to indicate that an action is being taken to process the call. The "101 Progress Report" message can be used to provide information associated with progression of the call. At 410, user B's device/system 402 communicates a "183 Session Progress—a=sendonly" message to user A's device/system 400. The "183 Session Progress—a=sendonly" message can be used to indicate that the INVITE message has been received and that audio (e.g., ring tone) is going to be sent back on the communication channel to user A.

At 412, user A's device/system 400 transmits an "UPDATE—a=sendreceive" message to user B's device system 402. The "UPDATE—a=sendreceive" message can be used to inform user B's device system 402 that user A's device/system 400 is going to transmit voice data over the established media channel. At 414, user B's device/system 402 transmits a "200 OK [UPDATE]" message to user A's device/system 400 to acknowledge that voice data is going to be transmitted over the media channel (e.g., RTP, etc.).

At 416, user A's device/system 400 transmits the recorded voice data to user B's device/system 402. At this point, user B can listen to the recorded voice data using a speaker, earpiece, or other listening device. User B can use the recorded voice data in deciding whether to answer the call. For example, the recorded voice data may be conveying an emergency situation, and user B may go ahead and answer the call knowing of the emergency. User B can place additional reliance on the integrity of the call since the voice of User A is included with the recorded voice data. While a certain order and number of operations are described with respect to FIGS. 3 and 4, the order and/or number of operations and/or components can be modified and/or reconfigured according to a desired implementation. Accordingly, other embodiments are available.

Figure 5A:
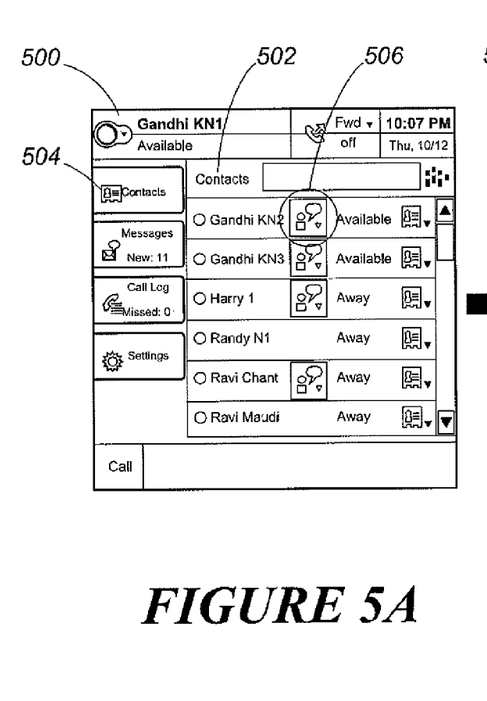
FIGS. 5A-5C depict an exemplary user interface (UI) of a communication device that can be used to record and transmit voice data during a call setup dialog.
Figure 5B:
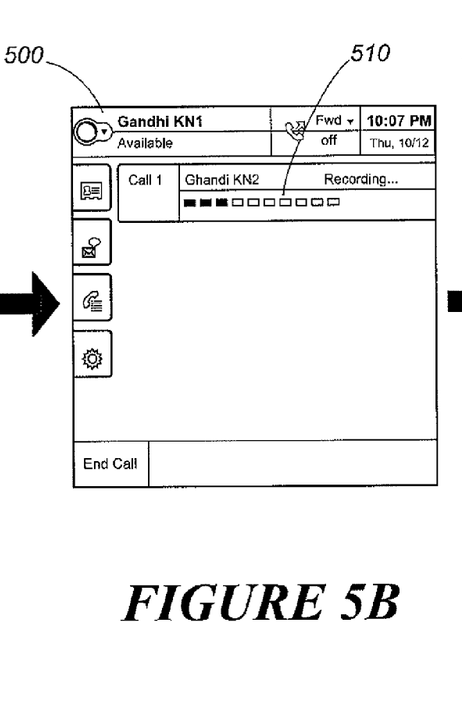
Figure 5C:
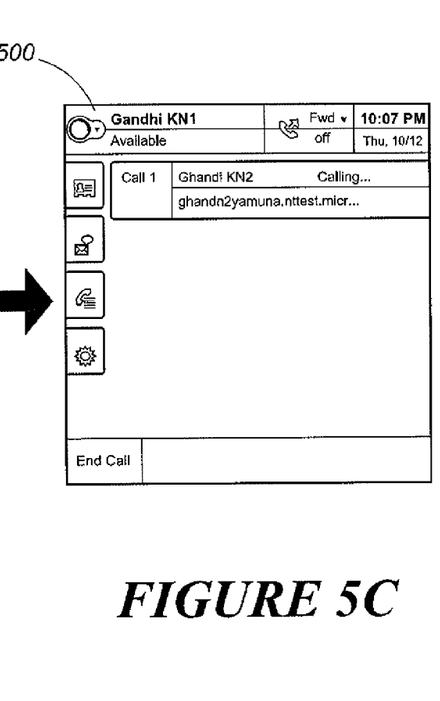

FIGS. 5A-5C depict an exemplary user interface (UI) 500 of a communication device that can be used to record and transmit voice data during a call setup dialog. As shown in FIG. 5A, UI 500 depicts a number of user contacts 502 after a user has selected a contacts key 504. The circled icon 506, when selected, brings up the interface 508 shown in FIG. 5B. As shown in FIG. 5B, a volume meter 510 provides feedback to the user as to the volume level of the recording as the user records the voice data to be transmitted during the call setup dialog. The length of the voice recording can be configured by the user or administrator. FIG. 5C depicts the call in progress.

Figure 6:
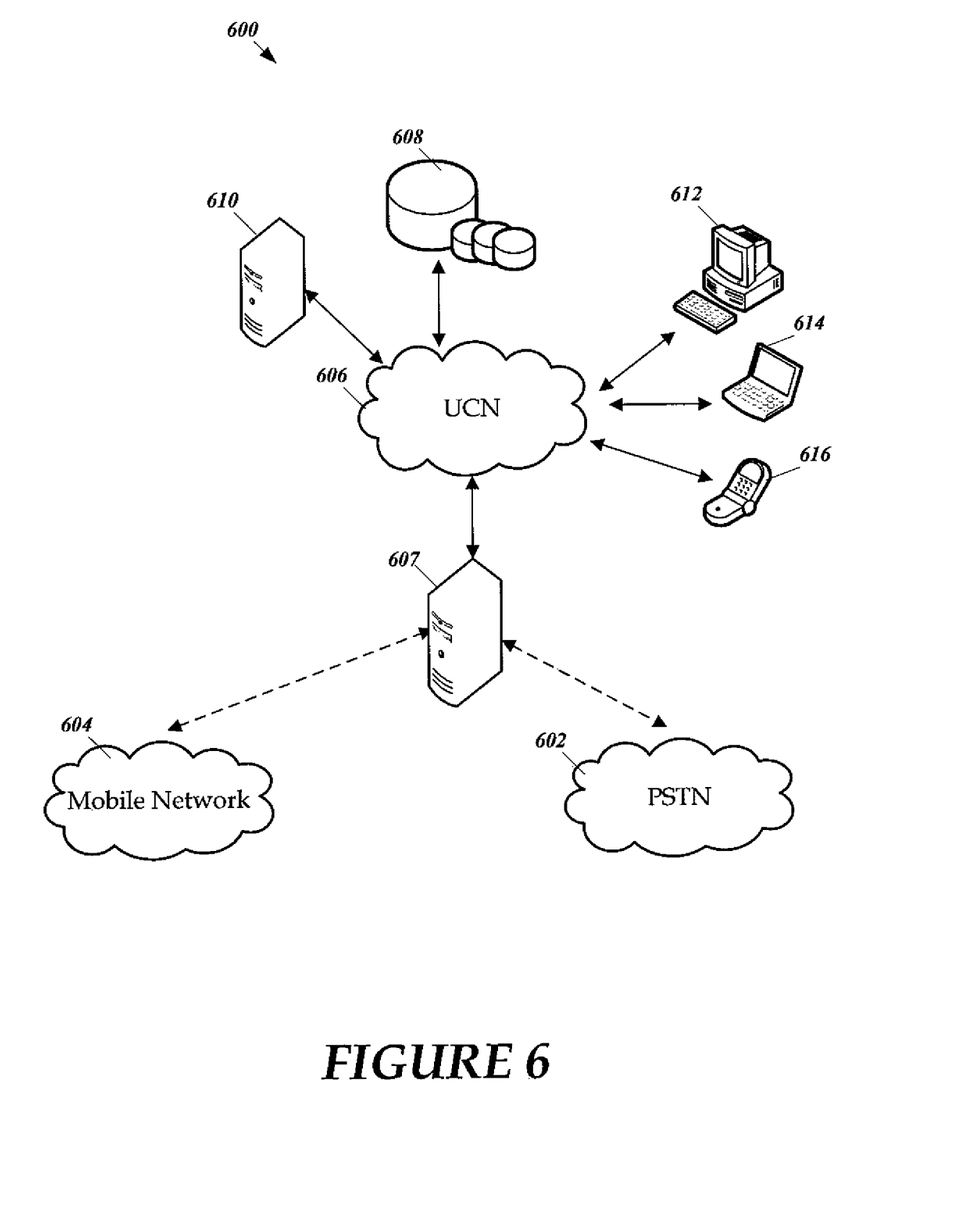
FIG. 6 illustrates an exemplary networked environment for implementation of various embodiments described herein.

FIG. 6 is an example networked environment 600, where embodiments may be implemented. Recorded voice data can be used to inform a communication of subject matter associated with a communication event in such a networked environment 600. As shown in FIG. 6, the networked environment includes a PSTN 602, mobile network 604, and UC network (UCN) 606, but is not so limited. In an embodiment, the networked environment 600 can be implemented in un-clustered systems or clustered systems employing a number of nodes communicating over one or more networks.

In various embodiments, the networked environment 600 can include a topology of servers, clients, devices, Internet service providers, communication media, and other network functionality. The networked environment 600 can also include a static or dynamic topology. The term "client" can refer to a client application, device, and/or system. While an integrated telephony system employing call reminders may involve greater or fewer components, certain components are discussed below.

A more advanced digital telephony system, such as a UC system, may reside side-by-side with mobile networks, public switched networks, etc. and communicate through those networks with the help of PBX systems, gateways, etc. Mediation server(s) 607 can be configured to provide signaling and media exchange between various systems. The networked environment 600 may also include a UC server for registering, routing, and other functionality, and a collaboration server for maintaining user and other information, such as calendar information, call reminder information, contact information, messaging information, etc.

Data associated with an architectural configuration (e.g. user names, phone numbers, call policies, configuration, records, etc.) can be stored in one or more data stores such as data stores 608, which can be directly or indirectly accessed by servers and/or clients or managed through a database server 610. The backbone of the UC system can be implemented using a UC network (UCN) 606, which can use a number of protocols such as SIP, RTP, etc. Client devices/systems (e.g., 612-616) can be configured as UCN user end points. Users can record, transmit, and/or receive voice data using a client device or one or more client applications executing on a client device.

UCN 606 can include a secure network such as an enterprise network, an unsecure network such as a wireless open network, the Internet, or some other network or combination of networks. UCN 606 provides communication between nodes described herein. By way of example, and not limitation, UCN 606 can include wired media such as a wired network or direct-wired connection, and/or wireless media such as acoustic, radio frequency (RF), infrared, and/or other wireless media. Many other configurations of computing devices, applications, data sources, data distribution systems may be employed to implement call reminder functionality. Moreover, the networked environment 600 of FIG. 6 is included for illustrative purposes. Embodiments are not limited to the example applications, modules, devices/systems, or processes.

Exemplary Operating Environment

Figure 7:
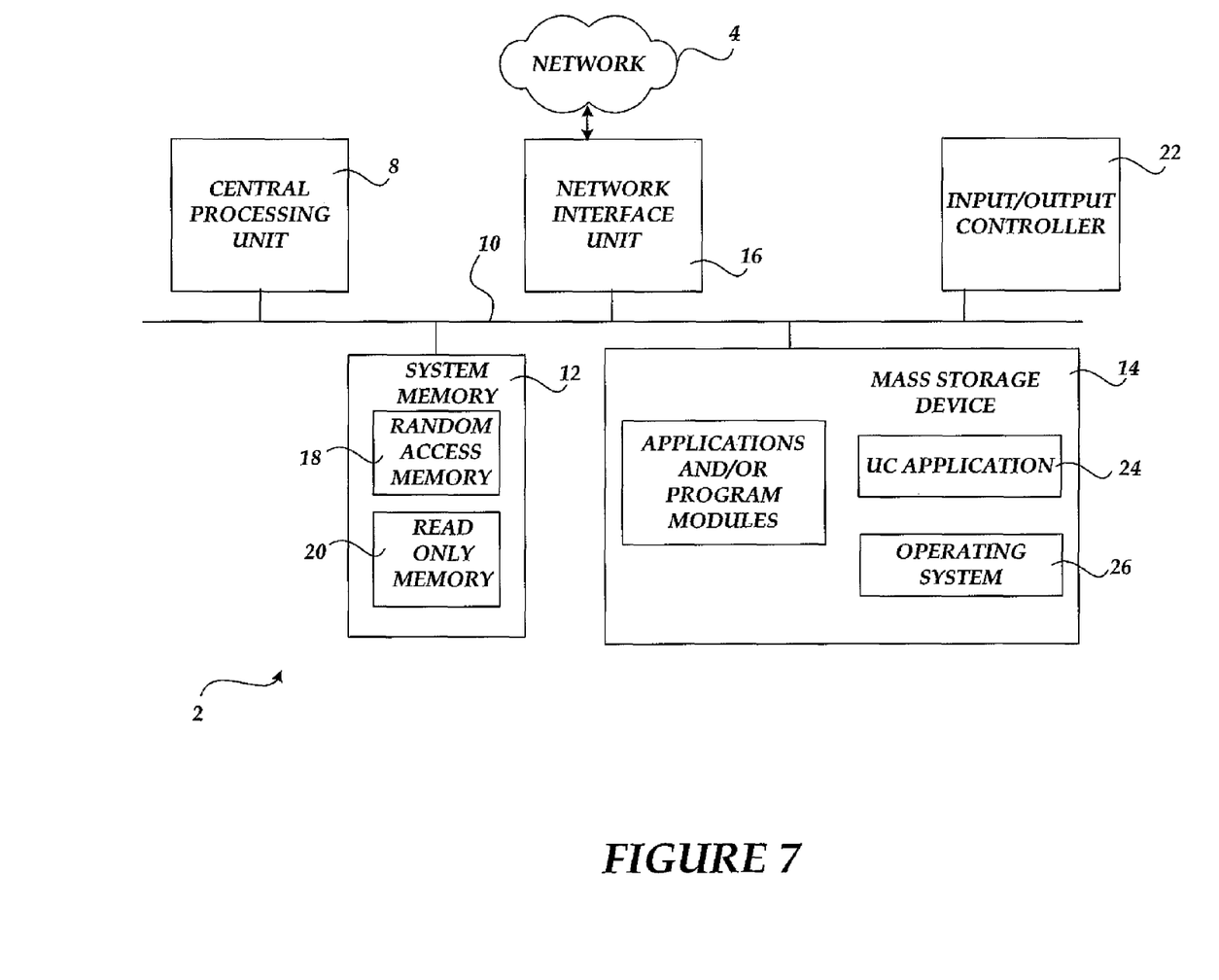
FIG. 7 is a block diagram illustrating an exemplary computing environment for implementation of various embodiments described herein.

Referring now to FIG. 7, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 7, an illustrative operating environment for embodiments of the invention will be described. As shown in FIG. 7, computing device 2 comprises a general purpose desktop, laptop, handheld, tablet, or other type of computer capable of executing one or more application programs. The computing device 2 includes at least one central processing unit 8 ("CPU"), a system memory 12, including a random access memory 18 ("RAM"), a read-only memory ("ROM") 20, a textual store 25, and a system bus 10 that couples the memory to the CPU 8. A basic input/output system containing the basic routines that help to transfer information between elements within the computer, such as during startup, is stored in the ROM 20.

The computing device 2 further includes a mass storage device 14 for storing an operating system 26, application programs, and/or other program modules. The mass storage device 14 is connected to the CPU 8 through a mass storage controller (not shown) connected to the bus 10. The mass storage device 14 and its associated computer-readable media provide non-volatile storage for the computing device 2. Although the description of computer-readable media contained herein refers to a mass storage device, such as a hard disk or CD-ROM drive, it should be appreciated by those skilled in the art that computer-readable media can be any available media that can be accessed or utilized by the computing device 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computing device 2.

According to various embodiments, the computing device 2 may operate in a networked environment using logical connections to remote computers through a network 4, such as a local network, the Internet, etc. for example. The computing device 2 may connect to the network 4 through a network interface unit 16 connected to the bus 10. It should be appreciated that the network interface unit 16 may also be utilized to connect to other types of networks and remote computing systems. The computing device 2 may also include an input/output controller 22 for receiving and processing input from a number of input types, including a keyboard, mouse, keypad, pen, stylus, finger, speech-based, and/or other means. Other input means are available including combinations of various input means. Similarly, an input/output controller 22 may provide output to a display, a printer, or other type of output device. Additionally, a touch screen or other digitized device can serve as an input and an output mechanism.

As mentioned briefly above, a number of program modules and data files may be stored in the mass storage device 14 and RAM 18 of the computing device 2, including an operating system 26 suitable for controlling the operation of a networked personal computing device, such as the WINDOWS operating systems from MICROSOFT CORPORATION of Redmond, Wash. for example. The mass storage device 14 and RAM 18 may also store one or more program modules. The mass storage device 14, or other storage, and the RAM 18 may store other application programs or modules, including UC application 24.

The UC application 24 may be a separate application or an integral module of a hosted service application that provides advanced communication services through computing device 2. The UC application 24 can employ different methods to provide voice and other data as part of a communication event. The UC application 24 can also provide advanced functionalities of a UC system to a user such as those associated with other forms of communication (video, instant messaging, etc.).

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of communicating in an integrated communication system, the method comprising:

receiving a calling signal on a communication device based in part on a response to a communication session invite message that is associated with a communication session;

recording voice data of a calling party which includes information that identifies subject matter that is associated with a communication subject to provide recorded voice data of the calling party for transmitting as part of a call;

sending an update message as part of a call setup dialog;

receiving an acknowledging signal responsive to the update message as part of the call setup dialog, the update message used in part to inform that the recorded voice data will be transmitted as part of providing the reason for the call to a receiving party as recorded in the recorded voice data of the calling party;

establishing a media channel for transmitting the recorded voice data of the calling party after receiving the acknowledging signal as part of the call setup dialog; and, transmitting the recorded voice data of the calling party over the media channel after receiving the acknowledging signal associated with the update message as part of communicating the reason for the call as part of the call setup dialog.

2. The method of claim 1, wherein recording the voice data includes recording a call subject in a calling party voice before sending the communication session invite.

3. The method of claim 1, wherein recording the voice data includes recording a calling party voice after sending the communication session invite and before the communication session invite has been accepted.

4. The method of claim 1, wherein recording the voice data includes recording a calling party voice which includes information that requires immediate attention.

5. The method of claim 4, further comprising associating subject matter with a voicemail list, wherein the subject matter can be played back as part of accessing voicemail.

6. The method of claim 1, wherein receiving the calling signal includes receiving the calling signal from a PSTN network gateway.

7. The method of claim 1, further comprising receiving an accepting signal based in part on the communication session invite message.

8. The method of claim 1, further comprising establishing a media channel for the voice data from either direction prior to accepting a SIP dialog.

9. The method of claim 1, further comprising creating a call reminder if the receiving party does not take the call.

10. The method of claim 9, further comprising scheduling a subsequent call based in part on call reminder information of the call reminder.

11. The method of claim 1, further comprising creating one of a voicemail and a call reminder if the receiving party does not take the call after listening to the voice data.

12. The method of claim 1, further comprising recording the voice data as part of a Voice Over Internet Protocol (VOIP) communication.

13. The method of claim 1, further comprising transmitting the recorded voice data as a ring tone.

14. An integrated communication system for facilitating user communications, the system comprising:
a communication device operable to:
transmit and receive communication signals including session messages associated with a session invite dialog
record voice data;
send an update message as part of a call setup dialog; and,
transmit the recorded voice data over a media channel after receiving an acknowledging signal responsive to the update message as part of the call setup dialog, the update message used in part to inform that the recorded voice data will be transmitted as part of providing a reason for a call as recorded in the recorded voice data of a calling party, wherein the recorded voice data identifies subject matter including the reason for the call that can be used by a receiving party to decide whether to participate in a communication session; and,
a serving device operable to establish the media channel for the voice data and coordinate signal transmissions of the communication device.

15. The system of claim 14, further comprising a mediation server operable to provide signaling and media translation operations between a VOIP infrastructure and a gateway.

16. The system of claim 14, wherein the communication device is one of wireless device and a wired device.

17. The system of claim 14, further comprising a PSTN network, a mobile network, and a local network in communication with one of the communication device and the serving device.

18. A computer-readable storage device, with instructions stored thereon for facilitating communications in an integrated telephony system by:
receiving a messaging signal using a computer telephony device based in part on a response to an invite message that is associated with an incoming call during a call setup dialog;
composing a voice recording which includes recorded voice data of a calling party, wherein the recorded voice data can be used to identify subject matter that can be used by a called party in deciding whether to answer the incoming call;
sending an update message as part of the call setup dialog;
receiving an acknowledgment message in response to the update message associated with the incoming call as part of the call setup dialog, the update message used in part to inform that the recorded voice data will be transmitted as part of providing a reason for the incoming call to a receiving party as recorded in the recorded voice data of the calling party; and,
transmitting the voice recording of the calling party on a media channel after receiving the acknowledgment message as part of the call setup dialog.

19. The computer-readable storage device of claim 18, wherein the instructions facilitate communication by creating one of a voicemail and a call reminder if the called party is unable to take the incoming call.

20. The computer-readable storage device of claim 18, wherein the instructions facilitate communication by composing the voice recording at a time of one of before and after sending an invite message.

* * * * *